United States Patent
Perez-Rovira

(10) Patent No.: US 11,250,281 B1
(45) Date of Patent: Feb. 15, 2022

(54) ENHANCED LIVENESS DETECTION OF FACIAL IMAGE DATA

(71) Applicant: Daon Enterprises Limited, Floriana (MT)

(72) Inventor: Adria Perez-Rovira, Barcelona (ES)

(73) Assignee: DAON ENTERPRISES LIMITED, Floriana (MT)

( * ) Notice: Subject to any disclaimer, the term of this patent is extended or adjusted under 35 U.S.C. 154(b) by 0 days.

(21) Appl. No.: 17/075,865

(22) Filed: Oct. 21, 2020

(51) Int. Cl.
*G06K 9/00* (2006.01)
*G06K 9/62* (2006.01)
*H04M 1/725* (2021.01)

(52) U.S. Cl.
CPC ..... *G06K 9/00906* (2013.01); *G06K 9/00255* (2013.01); *G06K 9/00335* (2013.01); *G06K 9/6217* (2013.01); *H04M 1/725* (2013.01)

(58) Field of Classification Search
CPC ........... G06K 9/00906; G06K 9/00255; G06K 9/00335; G06K 9/6217; H04M 1/725
See application file for complete search history.

(56) References Cited

U.S. PATENT DOCUMENTS

| | | | | |
|---|---|---|---|---|
| 2013/0063645 A1* | 3/2013 | Aoyama | ................ | H04N 5/343 348/333.01 |
| 2014/0009388 A1* | 1/2014 | Kang | .................... | G06F 3/0485 345/156 |
| 2014/0165187 A1* | 6/2014 | Daesung | ............. | H04L 63/0861 726/19 |
| 2014/0337930 A1* | 11/2014 | Hoyos | ..................... | G06F 21/34 726/4 |
| 2015/0124053 A1* | 5/2015 | Tamura | ................. | A63F 13/213 348/46 |
| 2015/0334567 A1* | 11/2015 | Chen | ..................... | H04W 12/06 455/411 |
| 2016/0026781 A1* | 1/2016 | Boczek | ............. | G06K 9/00885 726/18 |
| 2016/0063235 A1* | 3/2016 | Tussy | ............... | G06Q 20/40145 726/6 |
| 2016/0063314 A1* | 3/2016 | Samet | ................ | G06K 9/00268 348/78 |
| 2016/0188958 A1* | 6/2016 | Martin | ............... | G06K 9/00906 382/118 |
| 2017/0019400 A1* | 1/2017 | Drolshagen | ........... | H04L 9/3234 |
| 2018/0181737 A1* | 6/2018 | Tussy | ...................... | G06F 21/32 |
| 2018/0220043 A1* | 8/2018 | Sun | .......................... | G06K 9/22 |
| 2019/0108496 A1* | 4/2019 | Sun | ...................... | G06Q 20/363 |
| 2019/0373170 A1* | 12/2019 | Fujita | ..................... | G03B 37/04 |
| 2021/0182539 A1* | 6/2021 | Rassool | ............. | G06K 9/00288 |
| 2021/0224369 A1* | 7/2021 | Levitov | ................... | G06F 21/32 |

* cited by examiner

*Primary Examiner* — Ming Y Hon
(74) *Attorney, Agent, or Firm* — Kevin McDermott, Esq.

(57) ABSTRACT

A method for enhanced liveness detection of facial image data is provided that includes capturing movement data of an electronic device while capturing, using the electronic device, facial image data of a user. In response to determining the captured movement data is consistent with movement data expected to be captured during capture of facial image data, the method includes deciding the captured facial image data is genuine. In response to determining the captured movement data is different than movement data expected to be generated during capture of facial image data, the method includes deciding the captured facial image data is fraudulent.

18 Claims, 3 Drawing Sheets

ENHANCED LIVENESS DETECTION OF FACIAL IMAGE DATA

BACKGROUND OF THE INVENTION

This invention relates generally to facial images captured during an authentication transaction, and more particularly, enhancing liveness detection of facial image data.

Users conduct transactions with many different service providers in person and remotely over the Internet. Network-based transactions conducted over the Internet may involve purchasing items from a merchant website or accessing confidential information from a website. Service providers that own and operate such websites typically require successfully identifying users before allowing a desired transaction to be conducted. For service providers who require biometric authentication, a claim of identity and remotely captured data regarding a biometric modality are provided. However, imposters have been known to impersonate others by providing a false claim of identity supported by fraudulent data in an effort to deceive an entity into concluding the imposter is the person he or she claims to be. Such impersonations are known as spoofing.

Impostors have been known to use many methods to obtain or create fraudulent data for a biometric modality of another person that can be submitted during biometric authentication transactions. For example, imposters have been known to obtain two-dimensional pictures from social networking sites which can be presented to a camera during authentication to support a false claim of identity. Imposters have also been known to make physical models of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine data of a biometric modality of a person. The imposters use the obtained data for playback during fraudulent network-based authentication transactions. Such fraudulent data are difficult to detect using known liveness detection methods. Consequently, generating accurate network-based biometric authentication transaction results with data for a biometric modality captured from a person at a remote location depends on verifying the physical presence of the person during the authentication transaction as well as accurately verifying the identity of the person with the captured data. Verifying that the data for a biometric modality of a person captured during a network-based biometric authentication transaction conducted at a remote location is of a live person is known as liveness detection or anti-spoofing.

Liveness detection methods have been known to use structure derived from motion of a biometric modality, such as a person's face, to distinguish a live person from a photograph. Other methods have been known to analyze sequential images of eyes to detect eye blinks and thus determine if an image of a face is from a live person. Yet other methods have been known to illuminate a biometric modality with a pattern to distinguish a live person from a photograph. However, these methods may not be considered to be convenient and may not accurately detect spoofing. As a result, these methods may not provide high confidence liveness detection support for service providers dependent upon accurate biometric authentication transaction results.

BRIEF DESCRIPTION OF THE INVENTION

An aspect of the present disclosure provides a method for enhanced liveness detection of facial image data that includes capturing movement data of an electronic device while capturing, using the electronic device, facial image data of a user. In response to determining the captured movement data is consistent with movement data expected to be captured during capture of facial image data, the method includes deciding the captured facial image data is genuine. In response to determining the captured movement data is different than movement data expected to be generated during capture of facial image data, the method includes deciding the captured facial image data is fraudulent.

In another aspect of the present disclosure, the step of determining the captured movement data is consistent with movement data expected to be captured during capture of facial image data includes inputting the captured movement data into a pre-trained machine learning algorithm and generating a confidence score. The confidence score is compared against a threshold score, and the captured facial image data is decided to be genuine when the confidence score is at least equal to the threshold score.

In another aspect of the present disclosure, the method includes transmitting a message to a service provider computer system indicating the captured facial image data is genuine.

In another aspect of the present disclosure, the step of determining the captured movement data is consistent with movement data expected to be captured during capture of facial image data includes calculating an angle of rotation of the electronic device about an axis of the electronic device, comparing the calculated angle against a threshold angle, and deciding the captured facial image data is a replay when the calculated angle is greater than the threshold angle.

In another aspect of the present disclosure, the step of determining the captured movement data is different than movement data expected to be captured during capture of facial image data comprises determining the facial image data is a replay.

An aspect of the present disclosure provides an electronic device for enhanced liveness detection of facial image data that includes a processor and a memory configured to store data. The electronic device is associated with a network and the memory is in communication with the processor and has instructions stored thereon. The instructions when read and executed by the processor, cause the electronic device to capture movement data of the electronic device while capturing, using the electronic device, facial image data of a user. Moreover, the instructions when read and executed by the processor cause the electronic device to decide the captured facial image data is genuine in response to determining the captured movement data is consistent with movement data expected to be captured during capture of facial image data. Furthermore, the instructions when read and executed by the processor cause the electronic device to decide the captured facial image data is fraudulent in response to determining the captured movement data is different than movement data expected to be generated during capture of facial image data.

In another aspect of the present disclosure, the instructions executed by the processor that cause the electronic device to determine the captured movement data is consistent with movement data expected to be captured during capture of facial image data also cause the electronic device to generate, by inputting the captured movement data into a pre-trained machine learning algorithm, a confidence score from the captured movement data. The confidence score is compared against a threshold score, and the captured facial image data is decided to be genuine when the confidence score is at least equal to the threshold score.

In another aspect of the present disclosure, the instructions, when read and executed by the processor further cause the electronic device to transmit a message to a service provider computer system indicating the captured facial image data is genuine.

In another aspect of the present disclosure, the instructions, when read and executed by the processor to cause the electronic device to determine the captured movement data is consistent with movement data expected to be captured during capture of facial image data, further cause the electronic device to calculate an angle of rotation of the electronic device about an axis of the electronic device. The calculated angle is compared against a threshold angle and the captured facial image data is decided to be a replay when the calculated angle is greater than the threshold angle.

An aspect of the present disclosure provides a non-transitory computer-readable recording medium in an electronic device for enhancing liveness detection of facial image data. The non-transitory computer-readable recording medium stores instructions which when executed by a hardware processor perform the steps of the methods described above.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
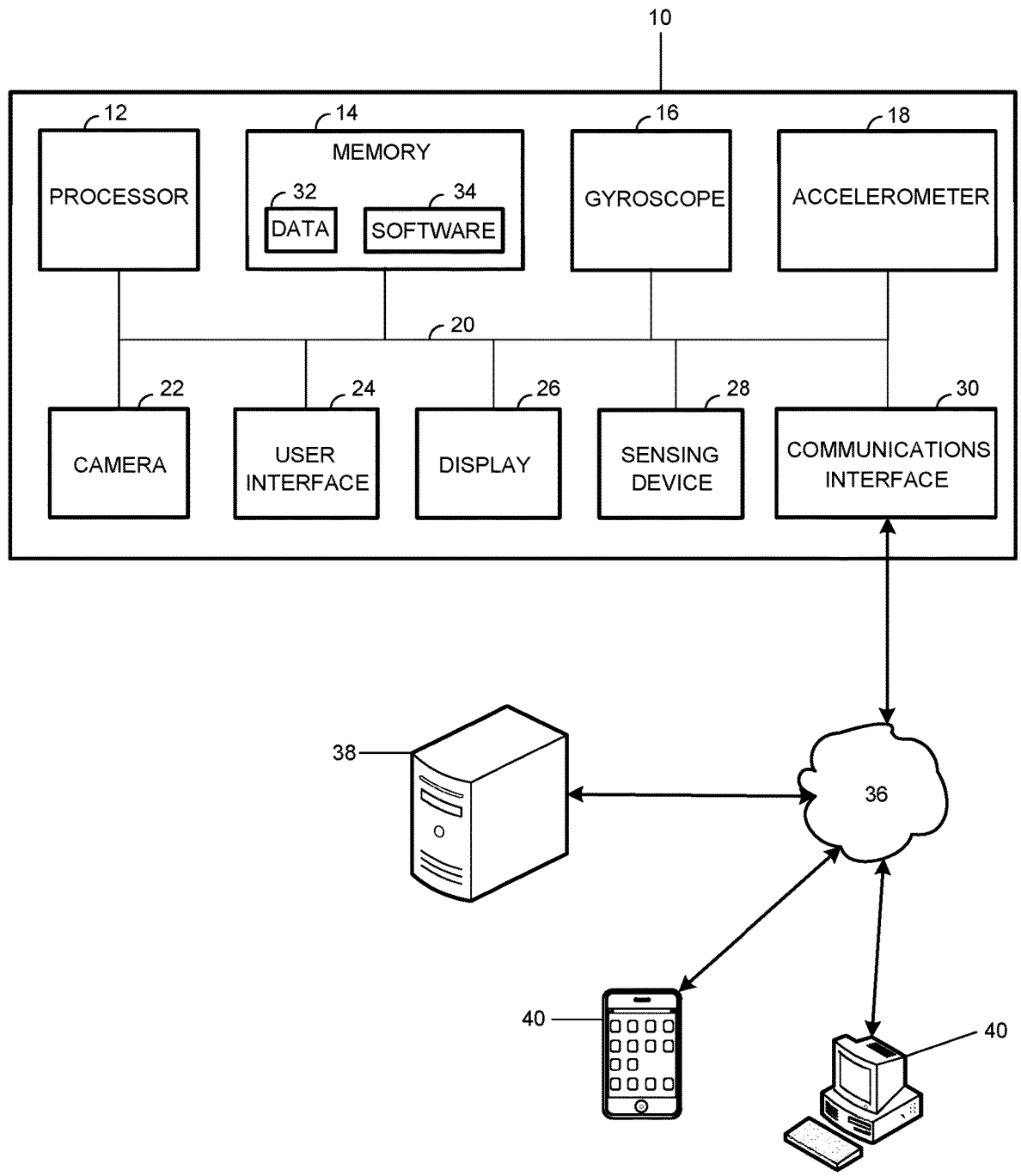
FIG. 1 is a diagram of an example computing device used for enhancing liveness detection of facial images according to an embodiment of the present disclosure.

FIG. 1 is a schematic diagram of an example computing device 10 used for enhancing liveness detection of facial images according to an embodiment of the present disclosure. The computing device 10 includes components such as, but not limited to, one or more processors 12, a memory 14, a gyroscope 16, one or more accelerometers 18, a bus 20, a camera 22, a user interface 24, a display 26, a sensing device 28, and a communications interface 30. General communication between the components in the computing device 10 is provided via the bus 20.

The computing device 10 may be any wireless hand-held consumer computing device capable of at least capturing image and motion data and processing the captured image and motion data. One example of the computing device 10 is a smart phone. Other examples include, but are not limited to, a cellular phone, a tablet computer, a phablet computer, and any type of hand-held consumer electronic device having wired or wireless networking capabilities capable of performing the functions, methods, and/or algorithms described herein.

The processor 12 executes software instructions, or computer programs, stored in the memory 14. As used herein, the term processor is not limited to just those integrated circuits referred to in the art as a processor, but broadly refers to a computer, a microcontroller, a microcomputer, a programmable logic controller (PLA), an application specific integrated circuit (ASIC), and any other programmable circuit capable of executing at least a portion of the functions and/or methods described herein. The above examples are not intended to limit in any way the definition and/or meaning of the term "processor."

The memory 14 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), and EEPROM (Electrically Erasable Programmable Read-Only Memory). Furthermore, the non-transitory computer-readable recording media may be implemented as smart cards, SIMs, any type of physical and/or virtual storage, or any other digital source such as a network or the Internet from which a computing device can read computer programs, applications or executable instructions.

The memory 14 may be used to store any type of data 32, for example, user data records. The data records are typically for users associated with the computing device 10. The data record for each user may include biometric modality data, biometric templates and personal data of the user. Biometric modalities include, but are not limited to, voice, face, finger, iris, palm, and any combination of these or other modalities. Biometric modality data is the data of a biometric modality of a person captured by the computing device 10. As used herein, capture means to record data temporarily or permanently, for example, biometric modality data of a person. Biometric modality data may be in any form including, but not limited to, image data and audio data. Image data may be a digital image, a sequence of digital images, or a video. Each digital image is included in a frame. The biometric modality data in the data record may be processed to generate at least one biometric modality template.

Additionally, the memory 14 can be used to store any type of software 34. As used herein, the term "software" is intended to encompass an executable computer program that exists permanently or temporarily on any non-transitory computer-readable recordable medium that causes the computing device 10 to perform at least a portion of the functions, methods, and/or algorithms described herein. Application programs are software. Software 34 includes, but is not limited to, an operating system, an Internet browser application, enrolment applications, authentication applications, liveness detection applications, face tracking applications, applications that use pre-trained models based on machine learning algorithms, feature vector generator applications, and any other software 34 and/or any type of instructions associated with algorithms, processes, or operations for controlling the general functions and operations of the computing device 10. The software 34 may also include computer programs that implement buffers and use RAM to store temporary data.

Authentication applications enable the computing device 10 to conduct user verification and identification (1:N) transactions with any type of authentication data, where "N" is a number of candidates. Machine learning algorithm applications include at least classifiers and regressors. Examples of machine learning algorithms include, but are not limited to, support vector machine learning algorithms, decision tree classifiers, linear discriminant analysis learning algorithms, and artificial neural network learning algorithms. Decision tree classifiers include, but are not limited to, random forest algorithms.

The process of verifying the identity of a user is known as a verification transaction. Typically, during a verification transaction a biometric template is generated from biometric modality data of a user captured during the transaction. The generated biometric template is compared against the corresponding record biometric template of the user and a matching score is calculated for the comparison. If the matching score meets or exceeds a threshold score, the identity of the user is verified as true. Alternatively, the captured user biometric modality data may be compared against the corresponding record biometric modality data to verify the identity of the user. Liveness detection applications facilitate determining whether captured biometric modality data, for example, captured facial image data is of a live person.

An authentication data requirement is the biometric modality data desired to be captured during a verification or identification transaction. For the example methods described herein, the authentication data requirement is for the face of the user. However, the authentication data requirement may alternatively be for any biometric modality or any combination of biometric modalities.

Biometric modality data may be captured in any manner. For example, for voice biometric data the computing device 10 may record a user speaking. For face biometric data, the camera 22 may record image data of the face of a user by taking one or more photographs or digital images of the user, or by taking a video of the user. The camera 22 may record a sequence of digital images at irregular or regular intervals. A video is an example of a sequence of digital images being captured at a regular interval. Captured biometric modality data may be temporarily or permanently recorded in the computing device 10 or in any device capable of communicating with the computing device 10. Alternatively, the biometric modality data may not be stored.

The gyroscope 16 and the one or more accelerometers 18 generate data regarding rotation and translation of the computing device 10 that may be communicated to the processor 12 and the memory 14 via the bus 20.

The camera 22 captures image data. The camera 22 can be one or more imaging devices configured to record image data of at least a portion of the body of a user including any biometric modality of the user while utilizing the computing device 10. Moreover, the camera 22 is capable of recording image data under any lighting conditions including infrared light. The camera 22 may be integrated into the computing device 10 as one or more front-facing cameras and/or one or more rear facing cameras that each incorporates a sensor, for example and without limitation, a CCD or CMOS sensor.

The user interface 24 and the display 26 allow interaction between a user and the computing device 10. The display 26 may include a visual display or monitor that displays information to a user. For example, the display 26 may be a Liquid Crystal Display (LCD), active matrix display, plasma display, or cathode ray tube (CRT). The user interface 24 may include a keypad, a keyboard, a mouse, an illuminator, a signal emitter, a microphone, and/or speakers.

Moreover, the user interface 24 and the display 26 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the computing device 10 to enter data, change settings, control functions, etc. Consequently, when the touch screen is touched, the user interface 24 communicates this change to the processor 12, and settings can be changed or user entered information can be captured and stored in the memory 14. The display 26 may function as an illumination source to apply illumination to a biometric modality while image data for the biometric modality is captured.

The illuminator may project visible light, infrared light or near infrared light on a biometric modality, and the camera 22 may detect reflections of the projected light off the biometric modality. The reflections may be off of any number of points on the biometric modality. The detected reflections may be communicated as reflection data to the processor 12 and the memory 14. The processor 12 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality. Alternatively, or additionally, the camera 22 may include the illuminator.

The sensing device 28 may include Radio Frequency Identification (RFID) components or systems for receiving information from other devices. The sensing device 28 may alternatively, or additionally, include components with Bluetooth, Near Field Communication (NFC), infrared, or other similar capabilities.

The communications interface 30 may include various network cards, and circuitry implemented in software and/or hardware to enable wired and/or wireless communications with computer systems 38 and other computing devices 40 via the network 36. Communications include, for example, conducting cellular telephone calls and accessing the Internet over the network 36. By way of example, the communications interface 30 may be a digital subscriber line (DSL) card or modem, an integrated services digital network (ISDN) card, a cable modem, or a telephone modem to provide a data communication connection to a corresponding type of telephone line. As another example, the communications interface 30 may be a local area network (LAN) card (e.g., for Ethernet™ or an Asynchronous Transfer Model (ATM) network) to provide a data communication connection to a compatible LAN. As yet another example, the communications interface 30 may be a wire or a cable connecting the computing device 10 with a LAN, or with accessories such as, but not limited to, other computing devices. Further, the communications interface 30 may include peripheral interface devices, such as a Universal Serial Bus (USB) interface, a PCMCIA (Personal Computer Memory Card International Association) interface, and the like.

The communications interface 30 also allows the exchange of information across the network 36. The exchange of information may involve the transmission of radio frequency (RF) signals through an antenna (not shown). Moreover, the exchange of information may be between the computing device 10 and any other computer systems 38 and any other computing devices 40 capable of communicating over the network 36. The computer systems 38 and the computing devices 40 typically include components similar to the components included in the computing device 10. The network 36 may be a 5G communications network. Alternatively, the network 36 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 36 may also be any type of wired network or a combination of wired and wireless networks.

Examples of other computer systems 38 include computer systems of service providers such as, but not limited to, financial institutions, medical facilities, national security agencies, merchants, and authenticators. Examples of other computing devices 40 include, but are not limited to, smart phones, tablet computers, phablet computers and cellular phones. The other computing devices 40 may be associated with any individual or with any type of entity including, but not limited to, commercial and non-commercial entities. The computing devices 10, 40 may alternatively be referred to as electronic devices, computer systems or information systems, while the computer systems 38 may alternatively be referred to as computing devices, electronic devices, or information systems.

Figure 2:
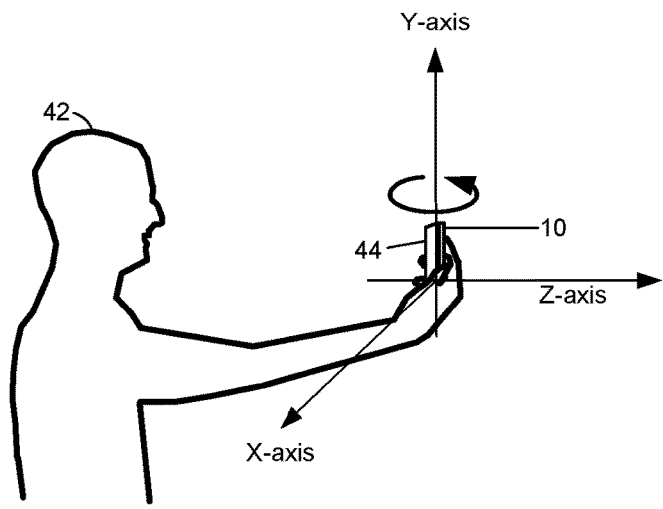
FIG. 2 is a side view of a person operating the computing device to capture facial image data.

FIG. 2 is a side view of a person 42 operating the computing device 10 to capture facial image data from his or her self. The person from whom biometric data is captured is referred to herein as a user 42. The user 42 also operates the computing device 10 during capture.

A three-dimensional Cartesian coordinate system having X, Y, and Z-axes may be virtually positioned in any location on the computing device 10 that enables monitoring translational and rotational movement of the computing device 10 while capturing facial image data. The coordinate system represents the three-dimensional space through which the computing device 10 may freely move.

The computing device 10 may be rotated about any combination of the X, Y, and Z-axes, and may be translated along any combination of the X, Y, and Z-axes. Rotation of the computing device 10 about the X-axis is called pitch (i.e., pitch angle), rotation of the computing device 10 about the Y-axis is called yaw (i.e., yaw angle), and rotation of the computing device 10 about the Z-axis is called roll (i.e., roll angle). The computing device 10 may also be simultaneously rotated about and translated along any combination of the X, Y and Z-axes in any manner.

During an authentication transaction, the computing device 10 may display a message that instructs the user 42 to capture facial image data from his or her self. The instruction is intended to prompt the user to capture facial image data from his or her self. The instruction does not prompt the user to move in any manner. For example, the instruction does not prompt the user to move closer to or further from the computing device 10 while capturing facial image data of the user, or for the computing device 10 to be similarly moved with respect to the user 42 while capturing facial image data of the user 42. Additionally, the instruction does not prompt the user to move the computing device 10 from a first position to a second position while capturing facial image data of the user.

During typical legitimate authentication transactions, a front surface 44 of the computing device 10 generally faces the user 42 while the computing device 10 captures facial image data of the user 42. The computing device 10 may be held in one position during capture, or may be held in and moved between any number of positions during capture. However, in each of the different positions and while moving between the different positions the front surface 44 of the computing device 10 is expected to generally face the user 42 at all times in order to capture genuine facial image data of the user 42.

Figure 3:
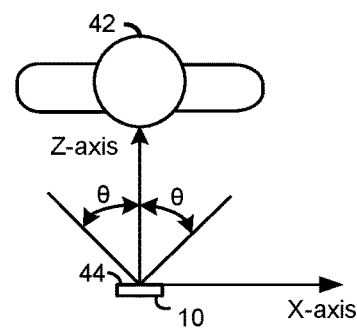
FIG. 3 is a top view of the person operating the computing device in which the computing device faces the person.

FIG. 3 is a top view of the user 42 operating the computing device 10. The front surface 44 of the computing device 10 faces the user 42 and the Z-axis is normal to the front surface 44 and extends towards the face of the user 42. While capturing facial image data, the computing device 10 may be rotated about its Y-axis clockwise and/or counter-clockwise through an angle theta ($\theta$). The angle theta ($\theta$) is measured around the Y-axis. It is contemplated by the present disclosure, that the front surface 44 of the computing device 10 is considered to generally face the user 42 when the angle theta ($\theta$) is less than or equal to forty-five degrees. Thus, when the computing device 10 is rotated through an angle theta ($\theta$) less than or equal to forty-five degrees while capturing facial image data of the user, the captured facial image data may be used to conduct a verification transaction.

Occasionally, some users 42 do not hold the computing device 10 such that the front surface 44 generally faces the user at all times while capturing facial image data. For example, some users 42 have been known to capture facial image data of facial images displayed by a different computing device.

Figure 4:
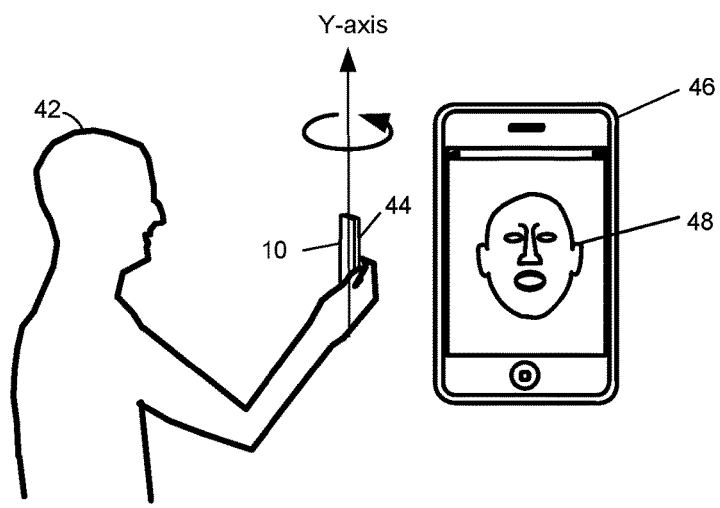
FIG. 4 is a sideview of the person operating the computing device; however, the computing device does not face the person.

FIG. 4 is a side view of the user 42 operating the computing device 10 in which the computing device 10 has been rotated about the Y-axis such that the front surface 44 does not face the user 42. Rather, the front face 44 of the computing device 10 faces a different computing device 46 displaying a facial image 48. While facing the different computing device 46, the computing device 10 captures image data of the facial image 48 displayed by the different computing device 46. Thus, it should be understood that the user 42 is likely conducting a replay attack and is likely an imposter. Replay attacks are difficult to detect using known liveness detection techniques.

To address this problem, the movement data captured by the gyroscope 16 and the accelerometer 18 while the computing device 10 captures facial image data is processed by a machine learning algorithm to determine whether or not the captured movement data is consistent with movement data expected to be captured during a legitimate authentication transaction.

With regard to FIG. 4, it should be understood that after the message to capture facial image data was displayed by the computing device 10, the computing device 10 was manipulated into position to capture image data 48 displayed by the different computing device 46. Additionally, after the message was displayed, the gyroscope 16 and the accelerometer 18 captured movement data of the computing device 10 while the computing device 10 was capturing facial image data, including movement data for manipulating the computing device 10 into position to capture image data 48 displayed by the different computing device 46.

A pre-trained machine learning algorithm may process the captured movement data to determine whether or not the captured movement data is consistent with movement data expected to be captured while capturing facial image data. For example, the pre-trained machine learning algorithm may determine whether or not the computing device 10 was generally facing the user 42 during all times while capturing the facial image data. If it is determined that the computing device 10 was not generally facing the user 42 while capturing facial image data, the captured facial image data is considered fraudulent and cannot be used in verification and identification transactions. Otherwise, the captured facial image data is considered to be genuine and can be used in verification and identification transactions. Additionally, or alternatively, the pre-trained machine learning algorithm may determine whether or not the captured movement data is consistent with expected movement data in any manner.

Figure 5:
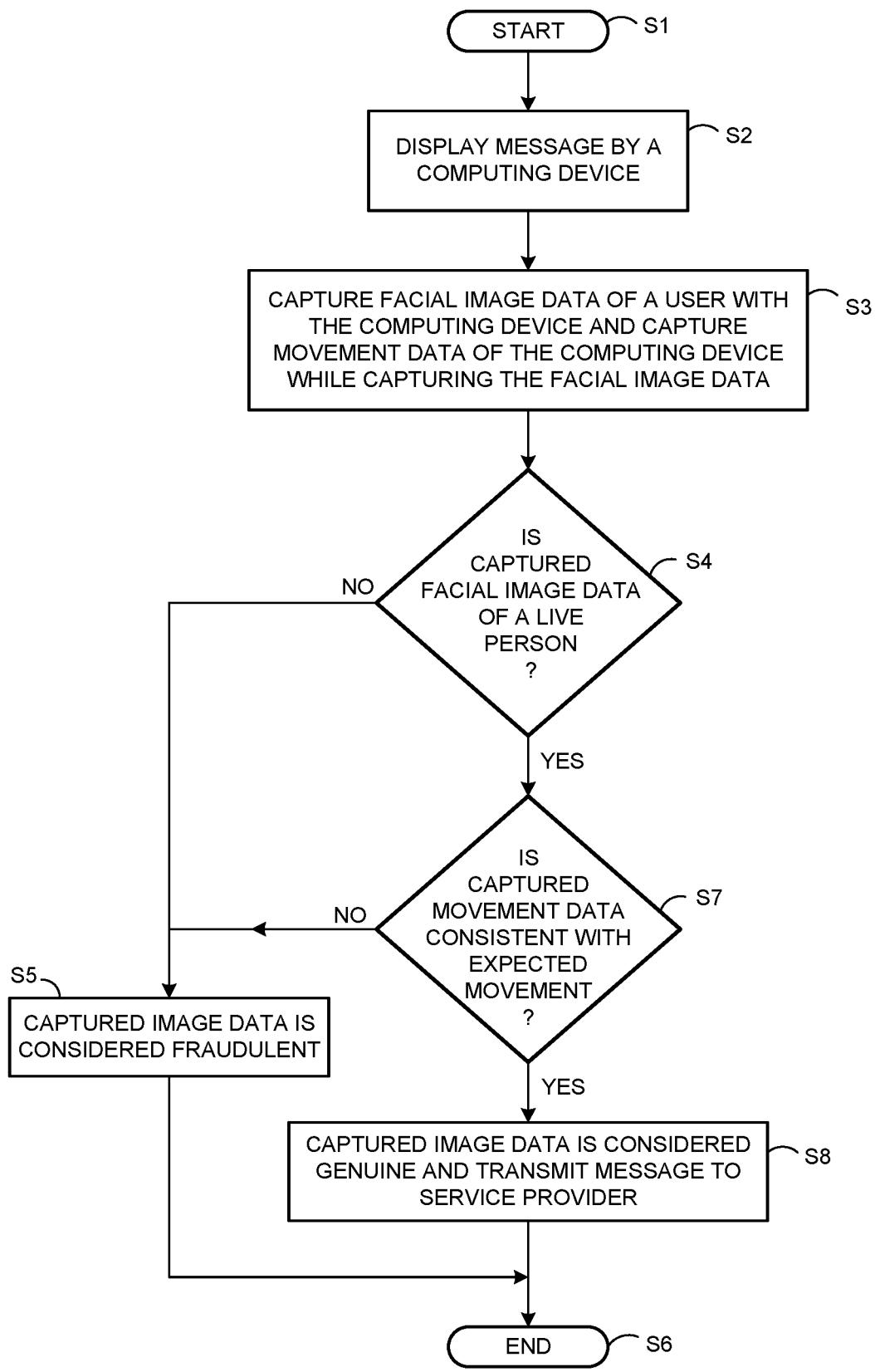
FIG. 5 is an example method and algorithm for enhancing liveness detection of captured facial images according to an embodiment of the present disclosure.

FIG. 5 is an exemplary method and algorithm for enhancing liveness detection of captured facial image data according to an embodiment of the present disclosure. When a user desires to conduct a network-based transaction with a service provider, the user may be required to prove he or she is live before being permitted to conduct, using the computing device 10, the network-based transaction. Such network-based transactions include, but are not limited to, buying merchandise from a merchant service provider website and accessing top secret information from a computer system. FIG. 5 illustrates exemplary operations performed when the computing device 10 runs software 34 stored in the memory 14 to determine whether or not facial image data was captured from a live user 42.

The method and algorithm start in step S1, then in step S2, the software 34 executed by the processor 12 in the computing device 10 causes the computing device 10 to display an instruction for instructing the user 42 to capture facial image data of his or her self. It is contemplated by the present disclosure that the instruction does not prompt the user to move in any manner. For example, the instruction does not prompt the user to move closer to or further from the computing device 10 while capturing facial image data of the user, or for the computing device 10 to be similarly moved with respect to the user 42 while capturing facial image data of the user 42. Additionally, the instruction does not prompt the user to move the computing device 10 from a first position to a second position while capturing facial image data of the user 42.

In response to displaying the message, in step S3, the computing device 10 is operated to capture facial image data of the user 42, and the gyroscope 16 and the accelerometer 18 capture movement data of the computing device 10 while the computing device 10 captures the facial image data.

Next, in step S4, the software 34 executed by the processor 12 of the computing device 10 causes the computing device 10 to determine whether or not the captured facial image data is of a live person. More specifically, a face liveness detection application uses the captured facial image data to calculate a confidence score and compares the confidence score against a threshold score. When the confidence score is less than a threshold score, in step S5, the captured image data is considered to be fraudulent and a message is transmitted to the service provider indicating that the captured image data is fraudulent. Next, in step S6, the method and algorithm end.

However, when the confidence score equals or exceeds the threshold score, in step S7, another confidence score is calculated that reflects the confidence the captured movement data is consistent with movement data expected to be captured during capture of genuine facial image data. For example, in step S7, the pre-trained machine learning algorithm may use the captured facial image data to calculate a confidence score indicating the likelihood that the computing device 10 was generally facing the user 42 during all times during capture of the facial image data. When the confidence score is equal to or greater than the threshold score, the computing device 10 is considered to have been moved in a manner consistent with expected movement for capturing genuine facial image data. As a result, in step S8, the captured facial image data is considered genuine and a message is transmitted to the service provider indicating the captured facial image date is genuine. Next, in step S6, the method and algorithm end.

However, in step S7, when the confidence score is less than the threshold score, the computing device 10 is not considered to have been moved in a manner consistent with that expected for capturing genuine facial image data. As a result, in step S5, the captured facial image data is considered fraudulent and a message is transmitted to the service provider indicating the captured facial image date is fraudulent. Next, in step S6, the method and algorithm end.

Using the method and algorithm for enhancing liveness detection of captured facial image data facilitates enhancing the accuracy and trustworthiness of liveness detection results, facilitates enhancing detection of spoofing attempts, accuracy and trustworthiness of user liveness detection results and of verification transaction results, and reducing time wasted and costs incurred due to successful spoofing and faulty verification transaction results. Additionally, user convenience for capturing image data with computing devices is enhanced.

The example methods and algorithms described herein may be conducted entirely by the computing device 10, or partly on the computing device 10 and partly on other computing devices 40 and computer systems 38 operable to communicate with the computing device 10 over the network 36. Moreover, the example methods described herein may be conducted entirely on the other computer systems 38 and other computing devices 40. Thus, it should be understood that it is contemplated by the present disclosure that the example methods described herein may be conducted on any combination of computers, computer systems 38, and computing devices 40. Furthermore, data described herein as being stored in the memory 14 may alternatively be stored in any computer system 38 or computing device 40 operable to communicate with the computing device 10 over the network 36. Additionally, the example methods described herein may be implemented with any number and organization of computer program components. Thus, the methods described herein are not limited to specific computer-executable instructions. Alternative example methods may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that, for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail. Rather, other variations of the methods and/or algorithms may be utilized within the spirit and scope of the claims.

What is claimed is:

1. A method for enhanced liveness detection of facial image data comprising the steps of:
    displaying, by an electronic device, an instruction for capturing a single facial image of a user without an instruction for moving the electronic device with respect to the user;
    capturing movement data of the electronic device while capturing, using the electronic device, facial image data of the user;
    in response to determining the captured movement data is consistent with movement data expected to be captured during capture of facial image data, deciding the captured facial image data is genuine; and
    in response to determining the captured movement data is different than movement data expected to be generated during capture of facial image data, deciding the captured facial image data is fraudulent.

2. The method according to claim 1, said determining the generated movement data is consistent with movement data expected to be generated during capture of facial image data step comprising:
    inputting the calculated movement data into a pre-trained machine learning algorithm;
    generating a confidence score;
    comparing the confidence score against a threshold score; and
    deciding the captured facial image data is genuine when the confidence score is at least equal to the threshold score.

3. The method according to claim 1, further comprising transmitting a message to a service provider computer system indicating the captured facial image data is genuine.

4. The method according to claim 1, said determining the calculated movement data is consistent with movement data expected to be captured during capture of facial image data step comprising:
    calculating an angle of rotation of the electronic device about an axis of the electronic device; and
    comparing the calculated angle against a threshold angle; and
    deciding the captured facial image data is a replay when the calculated angle is greater than the threshold angle.

5. The method according to claim 1, said determining the captured movement data is different than movement data expected to be captured during capture of facial image data step further comprises determining the facial image data is a replay.

6. The method according to claim 1, wherein the electronic device is a smartphone.

7. An electronic device for enhanced liveness detection of facial image data comprising:
    a processor; and
    a memory configured to store data, said electronic device being associated with a network and said memory being in communication with said processor and having instructions stored thereon which, when read and executed by said processor, cause said electronic device to:
    display an instruction for capturing a single facial image of a user without an instruction for moving the electronic device with respect to the user;
    capture movement data of said electronic device while capturing, using said electronic device, facial image data of the user;
    in response to determining the captured movement data is consistent with movement data expected to be captured during capture of facial image data, decide the captured facial image data is genuine; and
    in response to determining the captured movement data is different than movement data expected to be generated during capture of facial image data, decide the captured facial image data is fraudulent.

8. The electronic device according to claim 7 wherein the instructions executed by the processor that cause the electronic device to determine the captured movement data is consistent with movement data expected to be captured during capture of facial image data, when executed by the processor further cause said electronic device to:
    generate, by inputting the captured movement data into a pre-trained machine learning algorithm, a confidence score from the captured movement data;
    compare the confidence score against a threshold score; and
    decide the captured facial image data is genuine when the confidence score is at least equal to the threshold score.

9. The electronic device according to claim 7 wherein the instructions, when read and executed by the processor further cause said electronic device to transmit a message to a service provider computer system indicating the captured facial image data is genuine.

10. The electronic device according to claim 7 wherein the instructions executed by the processor that cause the electronic device to determine the captured movement data is consistent with movement data expected to be captured during capture of facial image data, when executed by the processor further cause said electronic device to:
    calculate an angle of rotation of said electronic device about an axis of said electronic device; and
    comparing the calculated angle against a threshold angle; and
    deciding the captured facial image data is a replay when the calculated angle is greater than the threshold angle.

11. The electronic device according to claim 7 wherein the instructions executed by the processor that cause the electronic device to determine the captured movement data is different than movement data expected to be captured during capture of facial image data, when executed by the processor further cause said electronic device to determine the facial image data is a replay.

12. The electronic device according to claim 7 wherein said electronic device is a smartphone.

13. A non-transitory computer-readable recording medium in an electronic device for enhanced liveness detection of facial image data, the non-transitory computer-readable recording medium storing instructions which when executed by a hardware processor cause the non-transitory recording medium to perform steps comprising:
    displaying an instruction for capturing a single facial image of a user without an instruction for moving the electronic device with respect to the user;

capturing movement data of the electronic device while capturing, using the electronic device, facial image data of the user;

in response to determining the captured movement data is consistent with movement data expected to be captured during capture of facial image data, deciding the captured facial image data is genuine; and in response to determining the captured movement data is different than movement data expected to be generated during capture of facial image data, deciding the captured facial image data is fraudulent.

14. The non-transitory computer-readable recording medium according to claim 13, wherein said determining the generated movement data is consistent with movement data expected to be generated during capture of facial image data step comprises:

inputting the calculated movement data into a pre-trained machine learning algorithm;

generating a confidence score;

comparing the confidence score against a threshold score; and deciding the captured facial image data is genuine when the confidence score is at least equal to the threshold score.

15. The non-transitory computer-readable recording medium according to claim 13, further comprising transmitting a message to a service provider computer system indicating the captured facial image data is genuine.

16. The non-transitory computer-readable recording medium according to claim 13, wherein said determining the calculated movement data is consistent with movement data expected to be captured during capture of facial image data step comprises:

calculating an angle of rotation of the electronic device about an axis of the electronic device; and comparing the calculated angle against a threshold angle; and deciding the captured facial image data is a replay when the calculated angle is greater than the threshold angle.

17. The non-transitory computer-readable recording medium according to claim 13, wherein said determining the captured movement data is different than movement data expected to be captured during capture of facial image data step further comprises determining the facial image data is a replay.

18. The non-transitory computer-readable recording medium according to claim 13, wherein the electronic device is a smartphone.

* * * * *